(12) United States Patent
Helferty

(10) Patent No.: US 7,010,885 B2
(45) Date of Patent: *Mar. 14, 2006

(54) ORIFICE SEALING PHYSICAL BARRIER

(75) Inventor: Raymond D. Helferty, Chesterfield Township, MI (US)

(73) Assignee: Sika Corporation, Lyndhurst, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/755,114

(22) Filed: Jan. 9, 2004

(65) Prior Publication Data

US 2004/0139660 A1 Jul. 22, 2004

Related U.S. Application Data

(63) Continuation of application No. 09/992,502, filed on Nov. 19, 2001, now Pat. No. 6,691,468.

(51) Int. Cl.
*E06B 3/32* (2006.01)
*E05C 21/02* (2006.01)

(52) U.S. Cl. ......................................... 49/463; 49/465

(58) Field of Classification Search ................. 49/463, 49/465, 57, 50, 466; 296/146.15; 52/202, 52/205, 208, 213; 403/13, 14, 326, 329; 277/316, 630, 637, 652, 931; 220/359.4, 220/359.1
See application file for complete search history.

(56) References Cited

U.S. PATENT DOCUMENTS

| | | |
|---|---|---|
| 3,383,811 A | 5/1968 | Ades |
| 3,692,084 A | 9/1972 | Irvine |
| 3,851,794 A | 12/1974 | Hehl |
| 4,290,536 A | 9/1981 | Morel |
| 4,363,420 A | 12/1982 | Andrews |
| 4,391,384 A | 7/1983 | Moore, III et al. |
| 4,463,870 A | 8/1984 | Coburn, Jr. et al. |
| 4,570,399 A | 2/1986 | Wentink |
| 4,588,104 A | 5/1986 | Danico |
| 4,588,105 A | 5/1986 | Schmitz et al. |
| 4,667,449 A | 5/1987 | Keating et al. |
| 4,761,319 A | 8/1988 | Kraus et al. |
| 4,890,418 A | 1/1990 | Sachs |
| 5,165,189 A | 11/1992 | Besal |
| 5,224,624 A | 7/1993 | Kraus |
| 5,327,682 A | 7/1994 | Holtz |
| 5,358,291 A * | 10/1994 | Malmanger et al. ........ 292/175 |

(Continued)

FOREIGN PATENT DOCUMENTS

EP     0911132A-A1 A1    4/1999

(Continued)

Primary Examiner—Hugh B. Thompson, II
(74) Attorney, Agent, or Firm—Rader, Fishman & Grauer PLLC

(57) ABSTRACT

A physical barrier for sealing an orifice in a panel member is presented. The physical barrier includes a carrier that has one or more locating pins mounted on it. The pins are adapted to locate the carrier in the orifice. The physical barrier also includes a sealing material attached to the carrier. Also included is a method of installing the physical barrier into an orifice of a panel member.

14 Claims, 3 Drawing Sheets

U.S. PATENT DOCUMENTS

| | | |
|---|---|---|
| 5,404,676 A | 4/1995 | Devlin |
| 5,483,028 A | 1/1996 | Holwerda |
| 5,505,324 A | 4/1996 | Danico |
| 5,551,191 A | 9/1996 | Maiwandi |
| 5,558,346 A | 9/1996 | Hartery |
| 5,577,740 A | 11/1996 | Purdom |
| 5,702,133 A | 12/1997 | Pavur et al. |
| 5,851,626 A | 12/1998 | McCorry et al. |
| 5,959,264 A | 9/1999 | Bruck et al. |
| 6,024,190 A | 2/2000 | Ritzema |
| 6,101,772 A | 8/2000 | Leonard et al. |
| 6,319,436 B1 * | 11/2001 | Jaeger et al. ............... 264/40.6 |
| 6,367,200 B1 | 4/2002 | LaConte |
| 6,378,931 B1 | 4/2002 | Kolluri et al. |
| 6,708,979 B1 * | 3/2004 | Stratman et al. ............ 277/316 |

FOREIGN PATENT DOCUMENTS

| | | | |
|---|---|---|---|
| EP | 1083116A-A1 | A1 | 3/2001 |

* cited by examiner

ORIFICE SEALING PHYSICAL BARRIER

This application is a continuation of U.S. application Ser. No. 09/992,502, filed Nov. 19, 2001, now U. S. Pat. No. 6,691,468.

FIELD OF THE INVENTION

This invention relates to devices and methods for sealing orifices in panel members.

BACKGROUND OF THE INVENTION

Physical barriers are commonly used to seal orifices in certain objects, such as panel members in motor vehicles, buildings, household appliances, etc. These barriers normally are used to prevent physical materials, fluids, and gases, such as environmental contaminants, fumes, dirt, dust, moisture, water, etc., from passing through the orifice. For example, an automotive panel, such as a door panel, typically has several orifices in the sheet metal, which are created for various reasons during manufacturing. Further, various structural components of automobile bodies have a variety of orifices, hollow posts, cavities, passages and openings that can allow contaminants into the passenger compartment. These holes, orifices, and cavities are typically barricaded with duct tape, butyl-based plastic patches, and sealing plugs made from foam, rubber, or some other material. Another known physical barrier for cavities involves introducing a foam product or a fiberglass matting to fill in the cavity.

Known barriers, however, are unsatisfactory for a variety of reasons. Sealing plugs, which were a step forward over other barriers, utilize snap-fit clips to hold the plug in place, i.e., in an orifice of a panel member. However, snap-fit clips on a sealing plug, without more, are insufficient because the clips cannot produce a contaminant-tight seal between the plug and the panel member. To overcome this, a sealer material, such as compressible rubber, adhesive, caulk or mastic, has been used in combination with a carrier to form the sealing plug. The sealer material may create a contaminant-tight seal between the carrier and the panel member.

With the introduction of the sealer material, however, new drawbacks arise. Often the sealer material needs to be activated in order to form a contaminant tight seal. Such activation may be in the form of mixing two components together or physical kneading of the material. This can be labor intensive, as well as placing a time limit on the installation process because the barrier must be placed in the orifice during the relatively limited active period of the sealer material. Furthermore, known sealer materials have not been able to protect against prolonged exposure to contaminants, but only against intermittent exposure to contaminants. This is a particular problem with respect to water.

Installation of known snap-fit barriers has also been problematic because installation of such barriers exactly in the center of the orifice has been difficult. Once the barrier is placed askew in the orifice, the presence of the sealer material prevents the barrier from centering itself. For the same reason, it is also difficult for the installer to center the barrier.

This skewed or off-center installation of the barrier creates two problems. First, it places unequal strain on the snap-fit clips that hold the barrier in place. This tends to lead to failure of one or more of the clips, which results in a leaky seal. To overcome this type of failure, stiffer snap-fit clips, which require more force to flex, are required. This in turn increases the force needed to install the barrier into the orifice to such a degree that a person cannot perform installation without mechanical assistance. Thus, force-multiplying tools or machines are required to install the barrier. The use of tools or machines to install these barriers increases the complexity and cost of the installation process beyond that which is economical.

Second, off-center installation increases the number of failed seals. Known sealer materials cannot compensate for off-center installation. Off-center installation can lead to gaps between the panel member and the carrier that are not filled by the sealer material. Thus, the size of the barrier must be closely matched to the size of the orifice to ensure that there are no gaps between the carrier and the panel member. Therefore, expensive precision manufacturing techniques are required in the formation of the orifice and the carrier to ensure that the barrier cannot be installed incorrectly, i.e., off-center.

Consequently, the inventor hereof has recognized a need for a physical barrier that overcomes one or more of these problems.

SUMMARY OF THE INVENTION

The present invention is a physical barrier for sealing an orifice in a panel member. The physical barrier includes a carrier that has one or more locating pins mounted on it. The pins are adapted to located the carrier in the orifice. The physical barrier also includes a sealing material attached to the carrier. The present invention also includes a method of installing the physical barrier into an orifice of a panel member.

DETAILED DESCRIPTION

Figure 1:
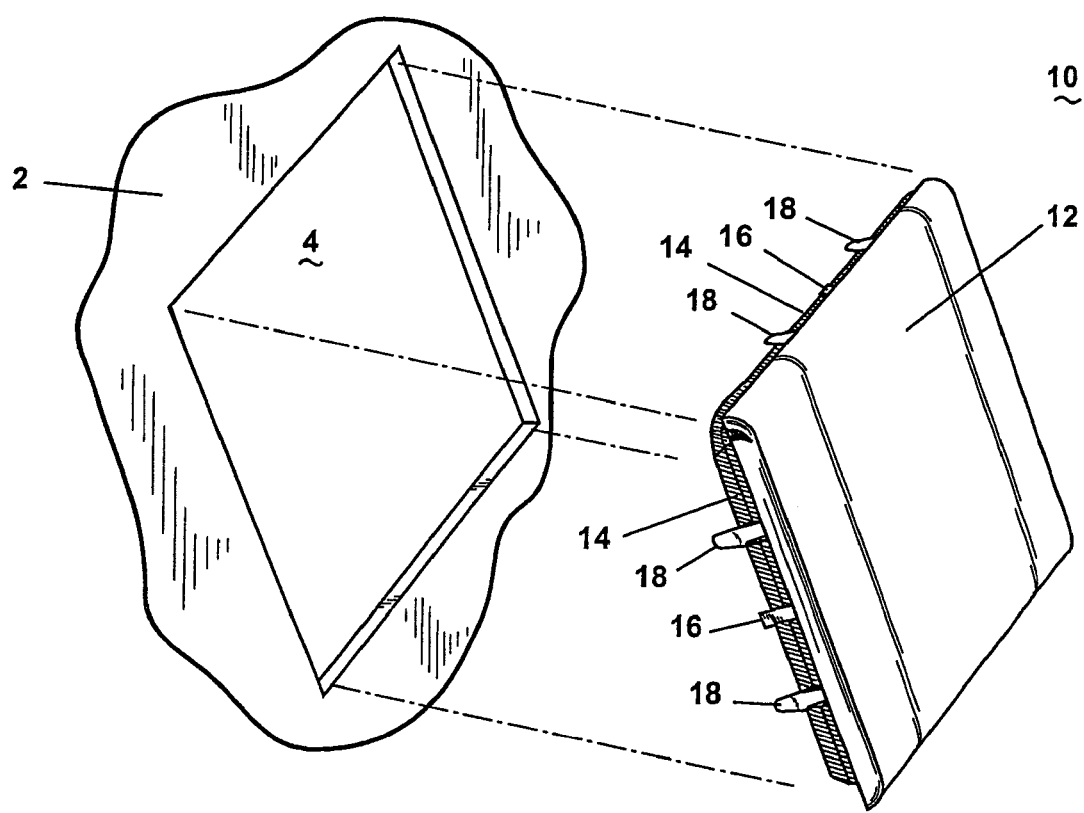
FIG. 1 shows a perspective view of a physical barrier of the present invention as it is being installed into a panel member with an orifice.

As seen in FIG. 1, a panel member 2 includes an orifice 4. Orifice 4 has a perimeter where panel member 2 ends and orifice 4 begins. Orifice 4 receives a physical barrier 10 that includes a carrier 12 and sealer material 14. As seen more clearly in FIG. 2, attached near the edge of carrier 12 are generally flexible snap-fit clips 16 and generally rigid locating pins 18. Clips 16 and pins 18 are roughly perpendicular to the main body 20 of carrier 12. Pins 18 maybe taller than or equal in height to clips 16.

Figure 2:
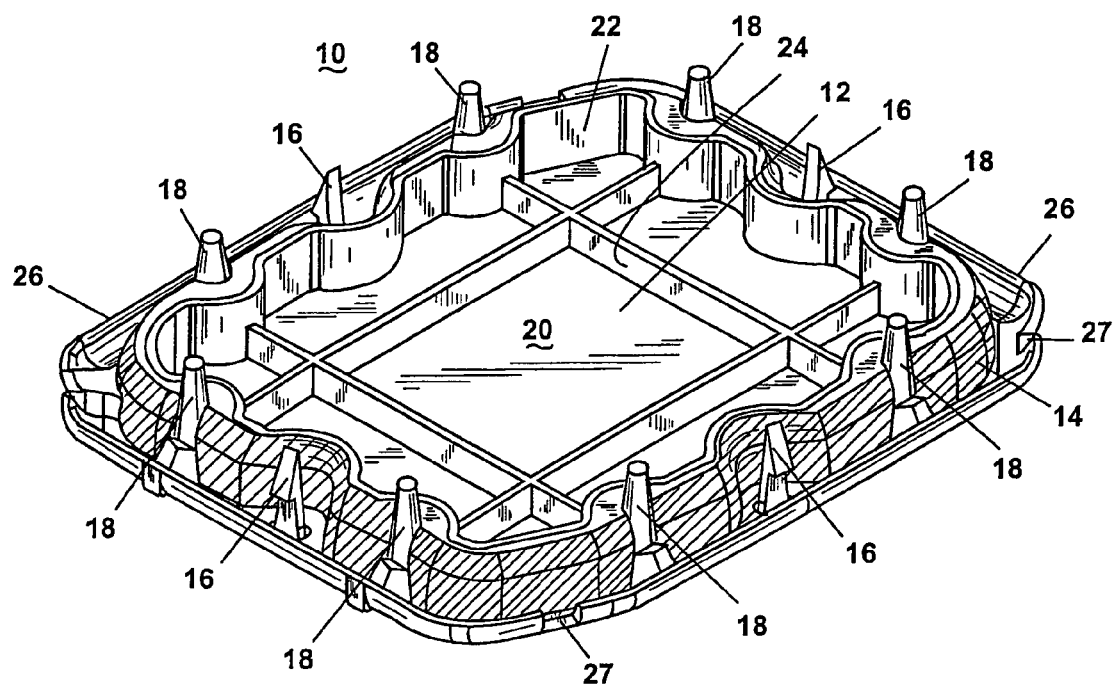
FIG. 2 shows a perspective view of a carrier with a sealer material of a physical barrier according to the present invention.

Carrier 12 may also include a wall 22, which may be set to the interior of clips 16 and pins 18. Carrier 12 may also include one or more ribs 24, which help give main body 20 structural stiffness. In one useful embodiment, a rib 24 is placed such that a pin 18 is located near either end of the rib, as shown in FIG. 2.

Carrier 12 also includes a lip 26 that defines the perimeter of carrier 12. The perimeter defined by lip 26 is larger than the perimeter of orifice 4. Lip 26 is set to the exterior of clips 16 and pins 18. Lip 26 may be continuous around the entire perimeter of the carrier or lip 26 may have one or more discontinuities 27. Discontinuities 27 may be use to introduce sealer material 14 onto carrier 12.

Figure 3:
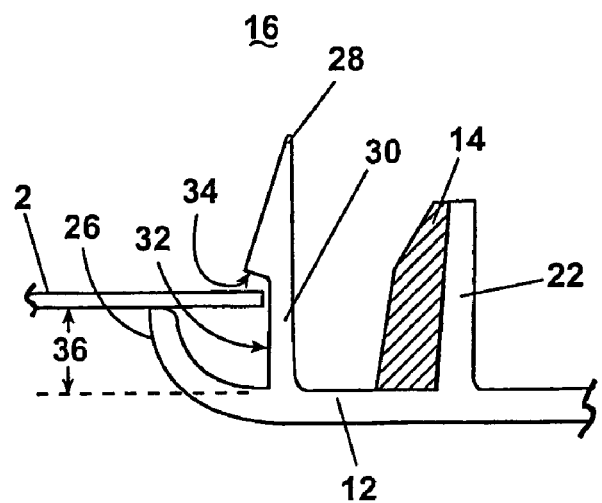
FIG. 3 shows a cross-section of a snap-fit clip used in a preferred embodiment of the present invention.

As best seen in FIG. 3, each clip 16 has a peak 28. These clip peaks 28, when taken as a group, generally define a shape that will fit inside orifice 4. Put another way, peaks 28 define a perimeter, called a clip peak perimeter, which is smaller than the orifice perimeter. In this way, all peaks 28 will be easily insertable into orifice 4 during installation.

On its body 30, each clip has a clip face 32. These faces 32, when taken as a group, generally define a clip face perimeter that is slightly larger than the clip peak perimeter, and the same size or smaller than the orifice perimeter. Thus, clip faces 32 may or may not abut panel member 2 when physical barrier 10 is properly installed.

Between peak 28 and clip face 32, each clip 16 has a wedge shaped head 34. Head 34 faces lip 26 as opposed to wall 22 and causes body 30 of clip 16 to flex as carrier 12 is installed into orifice 4. Head 34 prevents the incidental displacement of carrier 12. The distance between head 34 and carrier 12 is at least the lip height 36 plus the thickness of panel member 2. Other suitably shaped snap-fit clips may also be used in the present invention.

Figure 4:
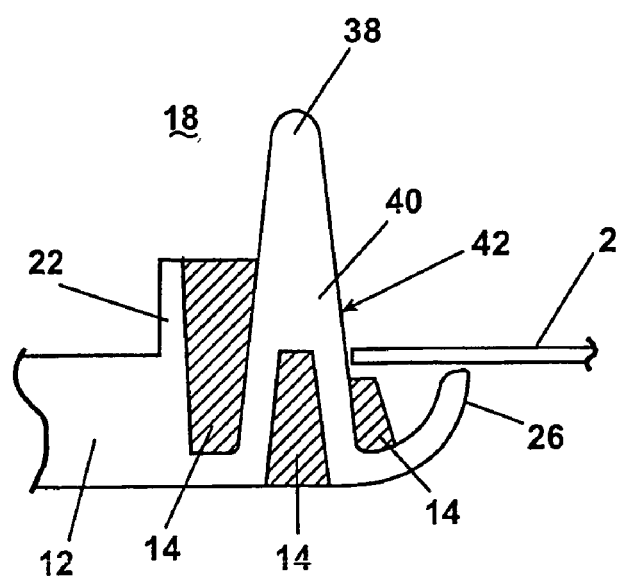
FIG. 4 shows a cross-section of a guide pin used in a preferred embodiment of the present invention.

As best seen in FIG. 4, each pin 18 has a peak 38. These pin peaks 38, when taken as a group, generally define a shape that will fit inside orifice 4. Put another way, peaks 38 define a pin peak perimeter that is smaller than the orifice perimeter. In this way, all pin peaks 38 will be easily insertable into orifice 4 during installation.

Between peak 38 and a base 40, each pin 18 has a guiding surface 42. At base 40, guiding surfaces 42, when taken as a group, define a base perimeter which is the same size as the orifice perimeter. Guiding surfaces 42 face lip 26 as opposed to wall 22. Thus, the base perimeter is larger or the same size as the clip face perimeter of clips 16 such that guiding surfaces 42 abut panel member 2 when physical barrier 10 is properly installed. Pins 18 make a smooth transition from peak 38 to base 40. Thus, the peak perimeter of pins 18 is smaller than the base perimeter of pins 18.

Clips 16 and pins 18 align so as to mimic the shape of orifice 4. For example, if orifice 4 has a straight portion, then clips 16 and pins 18 form a straight line. If orifice 4 has an arcuate portion, then clips and pins 18 form an arc that has the same curvature as the orifice.

Clips 16 and pins 18 may be arranged in a generally alternating pattern such that one pin is located between a pair of clips. Preferably, to securely hold barrier 10 in place, an equal number of clips 16 and pins 18 are utilized. Each pin 18 may be associated with two clips 16; one on its "right" and one on its "left," where right and left are relative. The number of clips and pins on a carrier may be chosen based on the size and shape of the orifice, as well as the desired amount of redundancy in clips to ensure that failure of one or more clips does not compromise the physical barrier. For round orifices, an alternating arrangement of clips and pins may be sufficient. For polygonal orifices, a pair of pins and a clip per side may be sufficient. This configuration is illustrated in FIG. 2.

In an alternate embodiment, one or more pins 18 may locate carrier 12 by being received in an receptacle adjacent to or near orifice 4. In this embodiment, seating the pin in the receptacle properly locates the carrier within the orifice.

The spacing between clips 16 and pins 18 is not critical, however, it is preferred that clips 16 and pins 18 are equally distributed along the perimeter of carrier 12 for round orifices or along the sides of the carrier for polygonal orifices.

Sealer material 14 is preferably located between clips 16 and wall 22, but may be located all around clips 16. Also, sealer material 14 is preferably located between pins 18 and wall 22, between pins 18 and lip 26, and under pins 18. However, sealer material 14 may also be utilized in less than all of these locations.

The sealer material 14 of barrier 10 may be any known sealing material, but preferably one that expands upon activation. One useful type of expandable material is a heat activated foam. While a heat activated foam is preferred, it is to be understood that the invention may be practiced with other types of foams which are, for example, chemically activated. While the use of clips 16 is preferred, the present invention could also be implemented without clips 16 where sealer material 14 adhesively attaches carrier 12 to panel member 2.

The use of the present invention is now described. Barrier 10 is inserted into orifice 4. Because the perimeter of carrier 12 is larger than the orifice perimeter, lip 26 ensures that carrier 12 is not over inserted into orifice 4. Pins 18 insure that carrier 12 is centered and not twisted.

Specifically, since pins 18 are rigid, as barrier 10 is inserted into orifice 4, guiding surfaces 42 of pins 18 guide carrier 12 to the center of orifice 4. Only after carrier 12 is mostly centered are bodies 30 of clips 16 required to flex. Carrier 12 is then seated such that guiding surfaces 42 at base 40 of pins 18 abut panel member 2. Depending on the clip face perimeter, clip faces 32 may also abut panel member 2.

By centering carrier 12, the maximum amount of strain all clips 16 have to endure is significantly reduced. This reduces the strength of clips 16 that are needed to properly install barrier 10, which in turn reduces the amount of force needed to install barrier 10. Thus, force-multiplying tools or machines are not needed to install the barriers of the present invention.

The alternating arrangement of clips 16 and pins 18 also helps reduce the amount of strain clips 16 have to endure. By placing at least one pin 18 on either side of clip 16, the carrier 12 is prevented from being installed in a twisted manner. Namely, clips 16 will never engage panel member 2 without guiding surfaces 42 of the two adjacent pins 18 also engaging panel member 2. The simultaneous engagement of guiding surfaces 42 and clips 16 prevents undue strain on clips 16. Because the clip and pin peak perimeters are smaller than the orifice perimeter, all clips 16 and pins 18 are insertable into orifice 4. Furthermore, because pins 18 are taller than clips 16, pins 18 enter orifice 4 first during installation, thus assuring that guiding surfaces 42 of pins 18 will center barrier 10 in orifice 4.

After carrier 12 is installed, sealer material 14 is activated to create the seal between carrier 12 and panel member 2. Wall 22 acts as a directional aid for sealer material 14, such that when sealer material 14 is activated, wall 22 helps direct sealer material 14 toward clips 16 and pins 18, and thus panel member 2. Expanded sealer material 14 adheres carrier 12 to panel member 2 surrounding orifice 4.

The use of expandable foam has several advantages over conventional sealer materials. Orifice 4 need not be formed using precision manufacturing techniques because the expandable foam will fill the available space. Any gaps between carrier 12 and panel member 2 will be filled by the expanding foam, thus creating a contaminant tight seal. The expanding foam also allows for a reduced number of sizes of barriers to be produced, because one barrier could be used to block several closely sized orifices. Furthermore, the seal produced by the use of expandable foam withstands prolonged exposure to contaminants, particularly water.

In this use of expandable foam, imperfect expansion of the foam can be tolerated, as can imperfect placement of the foam because as the foam expands, wall 22 will directs it toward clips 16, pins 18 and panel member 2 to help ensure a contaminant tight seal.

Heat expandable foams have another advantage when used in the automotive industry. Heat expandable foams allow for the elimination of an installation step because almost all automobiles have paints or coating that are heat dried. This eliminates the need for a separate activation step to seal the orifice.

Carrier 12 may be made of conventional materials, with the only consideration being the activation conditions for sealer material 14. Thus, carrier 12 must be able to maintain its physical rigidity at the activation conditions. For example, when using a heat activated sealer material, carrier 12 should not melt at temperatures used in the chosen heat source. In the vehicle coating and paint area, the carrier should withstand temperatures normally utilized in the paint and coating drying ovens. While metals may be used, plastics are preferred because of the reduced weight and reduced amount of force needed to install a plastic carrier as compared to a metal carrier. One useful plastic material is nylon.

While the invention has been specifically described in connection with certain specific embodiments thereof, it is to be understood that this is by way of illustration and not of limitation, and the scope of the appended claims should be construed as broadly as the prior art will permit.

What is claimed is:

1. A physical barrier for sealing an orifice in a panel member, comprising:
    a carrier configured to cover the orifice when installed;
    a plurality of conically-shaped locating pins having sloped guide surfaces, said locating pins extending from said carrier and configured to extend into the orifice when said carrier is installed so as to maintain said carrier substantially centered over the orifice; and
    a sealing material on said carrier configured to seal an interface between said carrier and the panel member when said carrier is installed.

2. The physical barrier of claim 1, further comprising at least one clip mounted to said carrier, which is physically distinct from said locating pins, configured to secure said carrier over the orifice relative to the panel member when installed into the orifice.

3. The physical barrier of claim 1, wherein said sealing material is an expandable foam.

4. The physical barrier of claim 1, wherein said sealing material is attached to an area of said carrier that substantially follows a perimeter of said carrier.

5. The physical barrier of claim 1, further comprising a wall attached substantially perpendicular to said carrier, said wall substantially following a perimeter of said carrier, said wall being positioned inside of an outermost perimeter of said carrier, so as to create a sealer area between said wall and said outermost perimeter of said carrier where said sealer material is attached to said carrier prior to installation.

6. The physical barrier of claim 5, wherein said wall is configured to direct said sealing material toward said outermost perimeter of said carrier when said sealing material is activated.

7. The physical barrier of claim 1, further comprising at least one attachment member mounted to said carrier, which is physically distinct from said locating pins, configured to secure said carrier over the orifice relative to the panel when installed into the orifice.

8. A method of sealing an orifice in a panel member, comprising:
    providing a carrier member having a plurality of conically-shaped locating pins and having sloped guide surfaces a sealing material thereon, said locating pins extending substantially perpendicular from said carrier member;
    inserting said locating pins into the orifice such that said plurality of locating pins maintain said carrier member substantially centered over the orifice when installed; and
    causing said sealing material to seal an interface between said carrier member and the panel member.

9. The method of claim 8, wherein said locating pins are configured such that an outer surface of each locating pin abuts a periphery edge of the orifice when the carrier is installed.

10. The method of claim 8, wherein said step of causing said sealing material to seal an interface includes activating said sealing material.

11. The method of claim 10, wherein said sealing material is activated by heating the sealing material.

12. The method of claim 8, further comprising the step of engaging a clip on said carrier member with a portion of the panel so as to secure said carrier member over the orifice.

13. The method of claim 8, further comprising the step of engaging an attachment member on said carrier member with a portion of the panel so as to secure said carrier member over the orifice.

14. A physical barrier for sealing an orifice in a panel member, comprising:
    a carrier configured to cover the orifice when installed;
    a plurality of locating pins extending from said carrier and configured to extend into the orifice when said carrier is installed so as to maintain said carrier substantially centered over the orifice;
    at least one attachment member mounted to said carrier, which is physically distinct from said locating pins, configured to secure said carrier over the orifice when installed into the orifice; and
    a sealing material on said carrier configured to seal an interface between said carrier and the panel member when said carrier is installed.

* * * * *

UNITED STATES PATENT AND TRADEMARK OFFICE
CERTIFICATE OF CORRECTION

PATENT NO. : 7,010,885 B2
DATED : March 14, 2006
INVENTOR(S) : Raymond D. Helferty It is certified that error appears in the above-identified patent and that said Letters Patent is hereby corrected as shown below:

<u>Column 6,</u>
Line 18, change "surfaces a sealing material thereon," to -- surfaces and a sealing material thereon, --.

Signed and Sealed this

Sixteenth Day of May, 2006

JON W. DUDAS
*Director of the United States Patent and Trademark Office*